US010455979B2

(12) United States Patent
Colston et al.

(10) Patent No.: US 10,455,979 B2
(45) Date of Patent: Oct. 29, 2019

(54) SMOKE TRAP APPARATUS AND SYSTEM (71) Applicant: Traeger Pellet Grills, LLC, Salt Lake City, UT (US)

(72) Inventors: Michael Colston, Salt Lake City, UT (US); Daniel Altenritter, Riverton, UT (US)

(73) Assignee: Traeger Pellet Grills, LLC, Salt Lake City, UT (US)

( * ) Notice: Subject to any disclaimer, the term of this patent is extended or adjusted under 35 U.S.C. 154(b) by 0 days.

(21) Appl. No.: 15/316,118

(22) PCT Filed: Sep. 8, 2016

(86) PCT No.: PCT/US2016/050735
§ 371 (c)(1),
(2) Date: Dec. 2, 2016

(87) PCT Pub. No.: WO2017/044598
PCT Pub. Date: Mar. 16, 2017

(65) Prior Publication Data
US 2018/0168395 A1 Jun. 21, 2018

Related U.S. Application Data (60) Provisional application No. 62/216,142, filed on Sep. 9, 2015.

(51) Int. Cl.
*A47J 37/07* (2006.01)
*A23B 4/044* (2006.01)

(52) U.S. Cl.
CPC .......... *A47J 37/0704* (2013.01); *A23B 4/044* (2013.01); *A47J 37/0754* (2013.01); *A47J 37/0786* (2013.01)

(58) Field of Classification Search
CPC ... A23B 4/044; A47J 37/0704; A47J 37/0754; A47J 37/0786
See application file for complete search history.

(56) References Cited

U.S. PATENT DOCUMENTS 4,884,554 A 12/1989 Yanagida
5,251,607 A * 10/1993 Traeger ............... A47J 37/0704
126/108

(Continued)

FOREIGN PATENT DOCUMENTS

CN 20421875 3/2015
KR 100589909 6/2006

OTHER PUBLICATIONS

International Search Report in application No. PCT/US2016/050735 dated Dec. 21, 2016.

*Primary Examiner* — Alfred Basichas
(74) *Attorney, Agent, or Firm* — TraskBritt (57) ABSTRACT

A smoke trap includes a receptacle with a floor opening, a tubular riser surrounding the opening and extending from the floor into a receptacle cavity, and a capping element disposed over an aperture in a riser. The capping element has an upper wall and a side wall partially bounding a body cavity and extending from the upper wall toward the floor. The capping element covers the aperture from above and from the side without fluidly sealing the aperture such that the aperture is in fluid communication with the body cavity and the body cavity is in fluid communication with the receptacle cavity. A portion of the side wall extends past the aperture such that the aperture is disposed within the body cavity. Grease management systems that include the smoke trap have means for transferring grease into the receptacle cavity to inhibit smoke from escaping the receptacle cavity through the opening.

14 Claims, 9 Drawing Sheets

(56) References Cited

U.S. PATENT DOCUMENTS

2004/0154604 A1     8/2004   Han
2004/0255926 A1   12/2004   Waits

* cited by examiner

SMOKE TRAP APPARATUS AND SYSTEM

CROSS-REFERENCE TO RELATED APPLICATIONS

The present invention is a 35 U.S.C. § 371 U.S. National Stage of PCT Application No. PCT/US16/50735, filed on Sep. 8, 2016, which claims the benefit of priority to U.S. Provisional Application No. 62/216,142, filed Sep. 9, 2015. The entire content of each of the aforementioned patent applications is incorporated herein by reference.

BACKGROUND

Technical Field

The present disclosure relates to systems, methods, and devices for grilling and/or smoking food products. In particular, the present disclosure relates to a smoke trap apparatus and systems and methods incorporating the same. More particularly, the present disclosure relates to a grease management system that includes a smoke trap apparatus for inhibiting the escape of smoke and/or heat from the internal grilling compartment of a grilling device.

Related Technology

Grilling and smoking food products typically includes the use of a grilling device having an internal grilling compartment. When the lid is closed, the grilling device can retain heat and smoke within the internal grilling compartment to cook and smoke the food product. Grilling devices may also include a smoke or heat exhaust to release the smoke and heat from the internal grilling compartment and a means for removing grease from the food product. Unfortunately, the means for removing grease often releases smoke and heat (e.g., before they can be used efficiently to cook the food product). For instance, the means for removing grease can include an opening in the body wall of the grilling device. Grease may drip out through the opening to be collected in a grease catch. However, the opening may also allow smoke and heat to escape from the internal grilling compartment. This can contribute to inefficient cooking and undesirable aesthetics as the smoke billows out of the grilling device.

Accordingly, there are a number of disadvantages in grilling devices and systems that can be addressed.

BRIEF SUMMARY

Implementations of the present disclosure solve one or more of the foregoing or other problems in the art with systems, methods, and devices for inhibiting the escape of smoke and/or heat from the internal grilling compartment of a grilling device. In particular, implementations of the present disclosure relate to a smoke trap apparatus, and more particularly, to a grease management system that includes a smoke trap apparatus and allows for the removal of grease without substantial loss of smoke and/or heat from the internal grilling compartment of a grilling device.

For example, one or more implementations of the present disclosure include a smoke trap apparatus that includes a weir having a weir body and a weir cap. In certain embodiments, the smoke trap apparatus includes a capping element. The capping element or weir cap can comprise a substantially concave body having an upper capping wall and a side wall extending from the upper capping wall. The upper capping wall and the side wall can partially bound an internal body cavity. In some embodiments, the smoke trap apparatus can also include a propping element extending into the internal body cavity such that at least a portion of the side wall extends below the portion of the propping element disposed within the internal body cavity. The capping element or a portion thereof can rest on and/or be supported by the propping element or a portion thereof in some embodiments.

Further implementations can include a grease management system that includes the smoke trap apparatus and a grease opening. The smoke trap apparatus can be disposed over the grease opening (e.g., such that the upper capping wall and side wall shield and/or cover the grease opening from above and from the side). Specifically, at least a portion of the side wall can extend below the grease opening such that the grease opening is disposed at least partially within the internal body cavity. The grease management system can also include means, mechanism, device, or assembly for transporting grease to the grease opening. For instance, the grease management system can include one or more grease flow elements (e.g., a canal, channel, trough, chute, tube, receptacle, bin, etc.) for transporting grease to the grease opening. In certain embodiments, the grease opening can be disposed above and/or extend upward from the floor of a grease bin.

One or more of the grease flow elements can transport grease into the grease bin. The grease opening extending from the floor of the grease bin can be partially covered by the smoke trap apparatus. However, the propping element can ensure that the upper capping wall does not seal off the opening. Grease in the grease bin can collect about the opening extension by flowing underneath the side wall. When the grease collects to a height sufficient to crest the top of the opening extension, the grease can flow into and/or through the opening. However, the collected grease can also surround the lower end of the capping element such that smoke is substantially prevented and/or inhibited from escaping under the side wall, into the body cavity, and out through the grease opening.

Additional features and advantages of exemplary implementations of the present disclosure will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the present disclosure can be obtained, a more particular description of the implementations briefly described above will be rendered by reference to specific implementations thereof which are illustrated in the appended drawings. For better understanding, the like elements have been designated by like reference numbers throughout the various accompanying figures. Understanding that these drawings depict only typical implementations of the invention and are not therefore to be considered to be limiting of its scope, the invention will be described and explained with additional specificity and detail through the use of the accompanying drawings in which.

DETAILED DESCRIPTION

Before describing the present disclosure in detail, it is to be understood that this disclosure is not limited to the specific parameters of the particularly exemplified systems, apparatus, assemblies, products, devices, kits, methods, and/or processes, which may, of course, vary. It is also to be understood that much, if not all of the terminology used herein is only for the purpose of describing particular embodiments of the present disclosure, and is not necessarily intended to limit the scope of the disclosure in any particular manner. Thus, while the present disclosure will be described in detail with reference to specific configurations, embodiments, and/or implementations thereof, the descriptions are illustrative only and are not to be construed as limiting the scope of the claimed invention.

Various aspects of the present disclosure, including devices, systems, methods, etc., may be illustrated with reference to one or more exemplary embodiments or implementations. As used herein, the terms "exemplary embodiment" and/or "exemplary implementation" means "serving as an example, instance, or illustration," and should not necessarily be construed as preferred or advantageous over other embodiments or implementations disclosed herein. In addition, reference to an "implementation" of the present disclosure or invention includes a specific reference to one or more embodiments thereof, and vice versa, and is intended to provide illustrative examples without limiting the scope of the invention, which is indicated by the appended claims rather than by the following description.

Furthermore, unless defined otherwise, all technical and scientific terms used herein have the same meaning as commonly understood by one of ordinary skill in the art to which the present disclosure pertains. While a number of methods, materials, components, etc., similar or equivalent to those described herein can be used in the practice of the present disclosure, only certain exemplary methods, materials, components, etc., are described herein.

It will be noted that, as used in this specification and the appended claims, the singular forms "a," "an" and "the" include plural referents unless the content clearly dictates otherwise. Thus, for example, reference to a "column" includes one, two, or more columns. Similarly, reference to a plurality of referents should be interpreted as comprising a single referent and/or a plurality of referents unless the content and/or context clearly dictate otherwise. Thus, reference to "columns" does not necessarily require a plurality of such columns. Instead, it will be appreciated that independent of conjugation; one or more columns are contemplated herein.

As used throughout this application the words "can" and "may" are used in a permissive sense (i.e., meaning having the potential to), rather than the mandatory sense (i.e., meaning must). Additionally, the terms "including," "having," "involving," "containing," "characterized by," as well as variants thereof (e.g., "includes," "has," and "involves," "contains," etc.), and similar terms as used herein, including the claims, shall be inclusive and/or open-ended, shall have the same meaning as the word "comprising" and variants thereof (e.g., "comprise" and "comprises"), and do not exclude additional, un-recited elements or method steps, illustratively.

Various aspects of the present disclosure can be illustrated by describing components that are coupled, attached, connected, and/or joined together. As used herein, the terms "coupled," "attached," "connected," and/or "joined" are used to indicate either a direct association between two components or, where appropriate, an indirect association with one another through intervening or intermediate components. In contrast, when a component is referred to as being "directly coupled," "directly attached," "directly connected," and/or "directly joined" to another component, no intervening elements are present or contemplated. Thus, as used herein, the terms "connection," "connected," and the like do not necessarily imply direct contact between the two or more elements. In addition, components that are coupled, attached, connected, and/or joined together are not necessarily (reversibly or permanently) secured to one another. For instance, coupling, attaching, connecting, and/or joining can comprise placing, positioning, and/or disposing the components together or otherwise adjacent in some implementations.

As used herein, directional and/or arbitrary terms, such as "top," "bottom," "front," "back," "forward," "rear," "left," "right," "up," "down," "upper," "lower," "inner," "outer," "internal," "external," "interior," "exterior," "anterior," "posterior," "proximal," "distal," and the like can be used only for convenience and/or solely to indicate relative directions and/or orientations and may not otherwise be intended to limit the scope of the disclosure, including the specification, invention, and/or claims. According, such directional and/or arbitrary terms are not to be construed as necessarily requiring a specific order or position.

To facilitate understanding, like reference numerals have been used, where possible, to designate like elements common to the figures. Furthermore, alternative configurations of a particular element may each include separate letters appended to the element number. Accordingly, an appended letter can be used to designate an alternative design, structure, function, implementation, and/or embodiment of an element or feature without an appended letter. Similarly, multiple instances of an element and/or sub-elements of a parent element may each include separate letters appended to the element number. In each case, the element label may be used without an appended letter to generally refer to instances of the element or any one of the alternative elements. Element labels including an appended letter can be used to refer to a specific instance of the element or to distinguish or draw attention to multiple uses of the element. However, element labels including an appended letter are not meant to be limited to the specific and/or particular embodiment(s) in which they are illustrated. In other words, reference to a specific feature in relation to one embodiment should not be construed as being limited to applications only within said embodiment.

It will also be appreciated that where two or more values, or a range of values (e.g., less than, greater than, at least, and/or up to a certain value, and/or between two recited values) is disclosed or recited, any specific value or range of values falling within the disclosed values or range of values is likewise disclosed and contemplated herein. Thus, disclosure of an illustrative measurement or distance less than or equal to about 10 units or between 0 and 10 units includes, illustratively, a specific disclosure of: (i) a measurement of 9 units, 5 units, 1 units, or any other value between 0 and 10 units, including 0 units and/or 10 units; and/or (ii) a measurement between 9 units and 1 units, between 8 units and 2 units, between 6 units and 4 units, and/or any other range of values between 0 and 10 units.

Various modifications can be made to the illustrated embodiments without departing from the spirit and scope of the invention as defined by the claims. Thus, while various aspects and embodiments have been disclosed herein, other aspects and embodiments are contemplated. It is also noted that systems, apparatus, assemblies, products, devices, kits, methods, and/or processes, according to certain embodiments of the present disclosure may include, incorporate, or otherwise comprise properties, features, components, members, and/or elements described in other embodiments disclosed and/or described herein. Thus, reference to a specific feature in relation to one embodiment should not be construed as being limited to applications only within said embodiment.

The headings used herein are for organizational purposes only and are not meant to be used to limit the scope of the description or the claims.

Implementations of the present disclosure include systems, methods, and devices for grilling and/or for inhibiting the escape of smoke and/or heat from the internal grilling compartment of a grilling device. In particular, certain implementations of the present disclosure relate to a smoke trap apparatus, and more particularly, to a grease management system that includes a smoke trap apparatus and allows for the removal of grease without substantial loss of smoke and/or heat from the internal grilling compartment of a grilling device.

It will be appreciated that while reference is made to "grills," "grilling," "grilling devices," "grilling systems," and the like, the present disclosure extends to smoking, baking, roasting, braising, barbequing, and other food preparation methods, as well as devices and systems for warming, cooking, and/or preparing food products in any of the above-recited or other manners. Likewise, while reference is made to an "oven section," "cooking section," "heating area," and the like, the present disclosure also extends to various spaces suitable for heating, including open grilling surfaces (e.g., exposed to ambient air), closed kilns and ovens, heating spaces that can be selectively opened and closed, and the like. Accordingly, the particular features, configurations, design characteristics, and/or components (assemblies) described herein can be applicable to a variety of different fields of use extending beyond cooking or otherwise preparing food products. These different fields of use are also contemplated herein. Thus, reference to one or more "grills," "grilling," "grilling devices," "grilling systems," and the like, or one or more components thereof, should not be construed as being limited only to applications involving food grilling or grilling devices.

Grills of the present disclosure can be heated using a variety of fuels. For example, the disclosure extends to grills configured to burn propane and/or natural gas and grills configured to burn solid fuel (e.g., charcoal, briquettes, wood, etc.). In some embodiments, the grill is configured to use wood pellets as fuel. In addition, in some embodiments, grills according to the present disclosure are configured to be moveable (e.g., by means of wheel(s) or other moving element). In other embodiments, grills may be configured as stationary appliances and/or may be installed in a relatively permanent fashion (e.g., bolted or otherwise fastened to a wall and/or floor, or otherwise installed as part of a kitchen or cooking area). Furthermore, grills according to the present disclosure can be configured for outdoor use in some embodiments. For instance, certain regulations and/or safety concerns may require and/or recommend the use of combustion-style grills only in outdoor, open-air areas, away from structures, vegetation, and/or other potentially flammable materials.

In addition, certain embodiments may be described with reference to one or more metals or metal materials. As used herein, the term "metal" refers to a material that comprises an elemental metal or metal alloy, blend, or combination. Certain embodiments may also refer to heat and/or smoke distribution and/or circulation. It will be appreciated that such forms of directing and/or using heat and/or smoke can include active distribution and/or circulation and/or passive distribution and/or circulation.

It is further to be understood that some of the drawings included herewith, and which are referenced herein, are diagrammatic, schematic, and other representations of example embodiments, and are not limiting on the present disclosure. Moreover, while various drawings are provided at a scale that is considered functional for some embodiments, the drawings are not necessarily drawn to scale for all contemplated embodiments. No inference should therefore be drawn from the drawings as to the necessity of any scale. Rather, the proportionality, scale, size, shape, form, function, and/or other feature of the disclosed embodiments can be altered without necessarily departing from the scope of this disclosure (unless such feature is expressly described herein as essential).

Furthermore, as indicated above, in the exemplary embodiments illustrated in the figures, like structures will be provided with similar reference designations, where possible. Specific language will be used herein to describe the exemplary embodiments. Nevertheless it will be understood that no limitation of the scope of the disclosure is thereby intended. Rather, it is to be understood that the language used to describe the exemplary embodiments is illustrative only and is not to be construed as limiting the scope of the disclosure (unless such language is expressly described herein as essential).

Alterations and further modifications of the inventive features illustrated herein, and additional applications of the principles illustrated herein, which would occur to one skilled in the relevant art and having possession of this disclosure, are to be considered within the scope of this disclosure. Unless a feature is described as requiring another feature in combination therewith, any feature herein may be combined with another feature of a same or different embodiment disclosed herein. Furthermore, various well-known aspects of illustrative systems, methods, apparatus, and the like are not described herein in particular detail in order to avoid obscuring aspects of the example embodiments.

In one or more implementations, the smoke trap apparatus comprises a weir having a weir body and a weir cap. In certain embodiments, the smoke trap apparatus comprises a capping element. The capping element or weir cap can comprise a substantially concave body having an upper capping wall and a side wall extending downward from the upper capping wall to form an internal body cavity. The upper capping wall and side wall can partially bound the internal body cavity and the capping element can have a lower body cavity opening formed in or by the side wall.

The capping element can be disposed in a cavity of a receptacle in some embodiments. The receptacle can include a receptacle floor and a perimeter wall extending from the floor. The floor and perimeter wall can partial bound the receptacle cavity and the floor can have a floor opening disposed therein. In certain embodiments, the capping element can be disposed over the floor opening. The receptacle can also have an upper opening formed in or by the perimeter wall.

In some embodiments, the receptacle or cavity thereof can be configured to retain a fluid therein. For instance, the smoke trap apparatus can also include a riser having an encircling side wall that surrounds the floor opening and extends from the floor of the receptacle into the receptacle cavity. The riser can also have an aperture positioned within the receptacle cavity and in fluid communication with the floor opening. Accordingly, the riser can comprise an opening extension that raises the access opening above the floor and into the receptacle cavity.

In certain embodiments, the aperture of the riser can be disposed and/or positioned in the body cavity of the capping element. For instance, at least a portion of the side wall can extend from the upper capping element, downward past the aperture of the riser such that the aperture of the riser is disposed within the body cavity (e.g., such that the upper capping wall and side wall cover and/or shield the aperture of the riser from above and from the side).

At least a portion of a bottom end of the side wall (opposite the upper capping wall) can be separated from the floor of the receptacle (e.g., by a first distance). For instance, the smoke trap apparatus can also include a propping element that supports the capping element above the floor (such that at least a portion of the bottom end of the side wall does not contact the floor). Accordingly, the capping element or a portion thereof can rest on and/or be supported by the propping element or a portion thereof in some embodiments. In addition, the propping element can support the capping element above the riser such that: (i) the capping element does not fluidly seal the aperture of the riser; (ii) the aperture of the riser is in fluid communication with the body cavity; and/or (iii) the body cavity is in fluid communication with the receptacle cavity. The propping element can extend from the floor, the riser, the capping element, or some other component.

It will be appreciated, therefore, that in some embodiments a fluid or other material in the receptacle cavity can exit the receptacle (freely) through the floor opening by passing under the side wall of the capping element and then over the side wall of the riser so as to pass through the aperture in the riser and through the opening in the receptacle floor.

Further implementations can include a grease management system that includes the smoke trap apparatus and means, mechanism, device, or assembly for transporting fluid to the receptacle or receptacle cavity. For instance, the grease management system can include one or more grease flow elements (e.g., a canal, channel, trough, chute, tube, receptacle, bin, etc.) for transporting grease to the receptacle cavity (through the upper opening in the perimeter side wall). In at least one embodiment, the fluid transfer element can have a fluid transport channel with an end thereof positioned adjacent to the upper receptacle opening so that grease or other fluid material can flow into the receptacle cavity via the channel.

The fluid can be retained in the receptacle cavity until the upper surface crests the side wall of the riser and passes through the aperture in the riser and is discharged through the opening in the receptacle floor. An external grease trap can collect the discharged fluid. In some embodiments, the fluid fills a space in the receptacle cavity between the floor and the side wall of the capping element. In other embodiments, the grease management system can include a liquefiable filler material disposed in the receptacle cavity to pre-fill the space in the receptacle cavity between the floor and the side wall of the capping element. The pre-filled material can ensure that smoke that settles into the receptacle cavity is inhibited from escaping through the floor opening (e.g., even before enough food product component is generated and/or transferred into the receptacle cavity to accomplish the same without the pre-filled material).

In some embodiments, the liquefiable material can comprise an oil, wax, or other material that can become liquid at a melting temperature. Accordingly, the use of certain materials with a tendency and/or ability to solidify at lower temperatures does not necessarily depart from the scope of this disclosure. In other embodiments, the receptacle cavity can be primed with water or other liquid material. Regardless, the pre-filled material can substantially prevent and/or inhibit smoke or other gases from passing through the floor opening.

Accordingly, smoke and/or heated air in the receptacle cavity can exit the receptacle (freely) through the upper opening in the perimeter wall in some embodiments. However, in certain embodiments, smoke and/or heated air in the receptacle cavity can be substantially precluded, prevented, and/or inhibited from exiting the receptacle cavity through the floor opening (e.g., because the fluid in the receptacle cavity prevents and/or inhibits the smoke and/or heated air from passing under the side wall of the capping element and then over the side wall of the riser so as to pass through the aperture and through the opening).

Figure 1A:
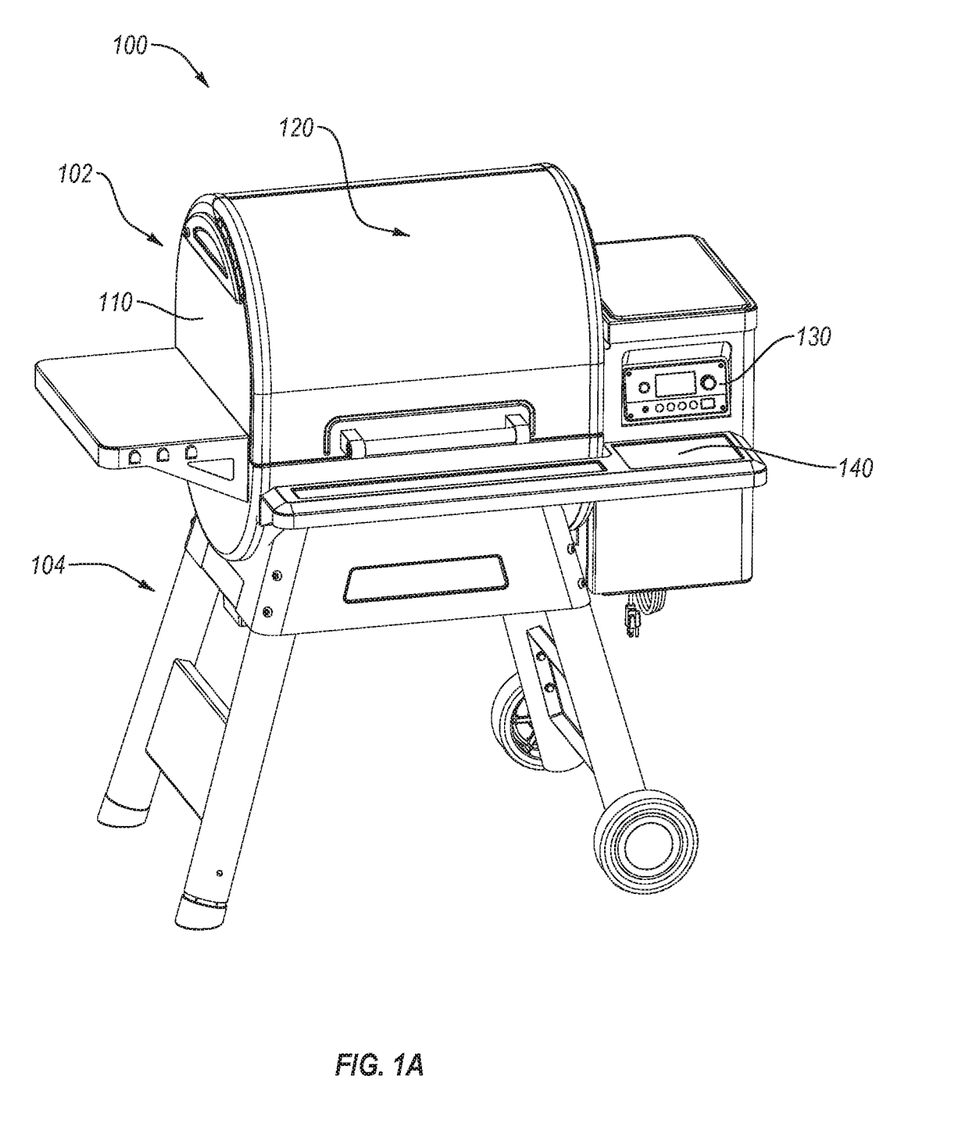
FIGS. 1A and 1B illustrate, respectively, a grilling device in a closed (FIG. 1A) and an opened (FIG. 1B) configuration according to an implementation of the present disclosure.
Figure 1B:
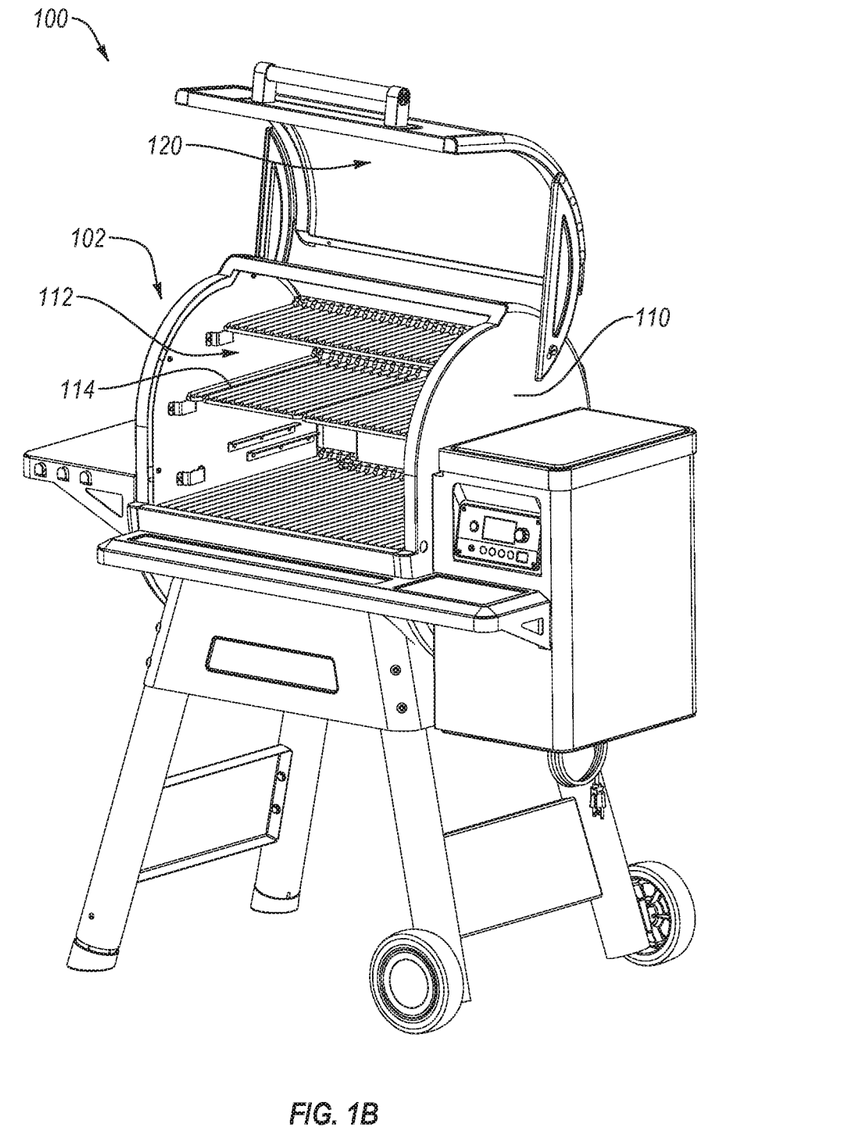

Reference will now be made to the figures to describe various aspects of example embodiments of the disclosure. FIGS. 1A and 1B depict a grilling device 100. Grilling device 100 can have an oven section 102, a support element 104 supporting oven section 102 above the ground, a hopper 130 for storing and delivering a fuel source (e.g., wood pellets) to oven section 102, and utility shelves 140. Oven section 102 comprises an outer wall 110 and/or a lid 120 that at least partially bound an internal grilling compartment 112. One or more grill racks 114 can be disposed within the internal grilling compartment 112 for receiving a food product to be prepared therein.

Figure 2A:
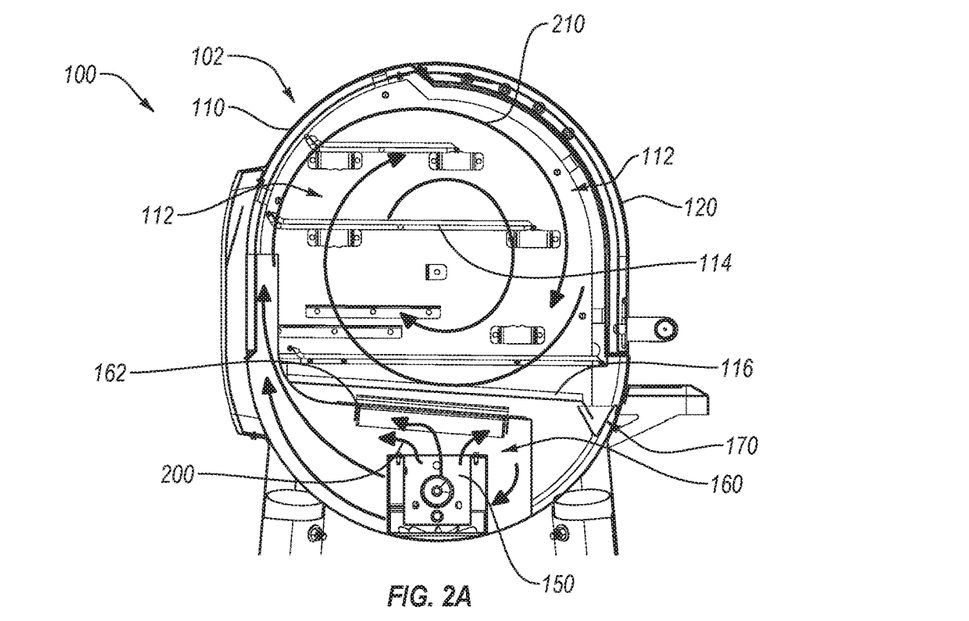
FIGS. 2A and 2B illustrate, respectively, a cross-sectional view (FIG. 2A) and a partial cut-away view (FIG. 2B) of the grilling device of FIGS. 1A and 1B having a grease management system with smoke trap apparatus according to an implementation of the present disclosure.
Figure 2B:
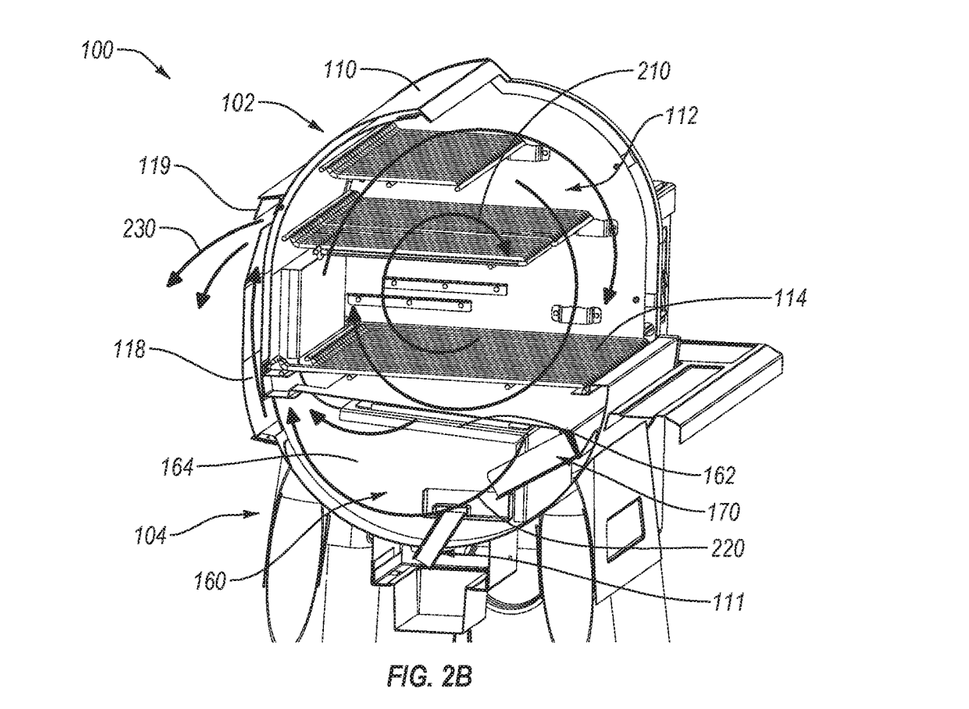

As illustrated in FIGS. 2A and 2B, grilling device 100 and/or oven section 102 thereof can also include a heating element 150 and/or a smoke circulating element 160 (e.g., disposed at least partially within internal grilling compartment 112). In operation, a fuel source from hopper 130 can be transported and delivered into heating element 150 by means of an auger (not shown). In heating element 150, the fuel source can be heated and/or ignited so as to produce heat and/or smoke 200. Heated air and/or smoke 210 can escape heating element 150 through and/or by means of smoke circulating element 160. With lid 120 closed against outer wall 110 and/or disposed in a closed configuration (as illustrated in FIGS. 1A and 2A), the heated air and/or smoke can be circulated as circulating heated air and/or smoke 210 within internal grilling compartment 112 by means of smoke circulating element 160. Circulating heated air and/or smoke 210 can prepare (e.g., cook, smoke, grill, etc.) a food product disposed within internal grilling compartment 112 (e.g., on grill rack(s) 114).

As the food product is prepared, one or more food product components (e.g., a portion of the food product or addition thereto, including grease, fat, oil, blood, water, charred food product, seasoning, sauce, marinade, etc.) can fall through grill racks 114 and contact (e.g., land on) a drip tray 116 (e.g., disposed below grill rack(s) 114). Drip tray 116 can be disposed at a slant and/or angle (e.g., relative to a horizontal plane, the ground, a plane perpendicular to the force of gravity, etc.). For instance, as illustrated in FIG. 2B, drip tray 116 can have a rear edge connected to the inner surface of outer wall 110 (e.g., by means of a mounting element, such as a bracket or ledge). The rear edge of drip tray 116 and/or corresponding rear edges of grill racks 114 (as well as the rear mounting elements) can be configured to accommodate the vertically extending portion of smoke circulating element 160.

The opposing front edge of drip tray 116 can be supported and/or disposed in a front portion of the internal grilling compartment 112 and/or at a (vertical) position lower than the position of the rear edge of drip tray 116. For instance, the front edge of drip tray 116 can be supported by a front mounting element (e.g., extending from the inner surface of outer wall 110) and/or a component of a fluid transport mechanism 170.

Accordingly, the one or more food product components that fall through grill racks 114 and land on drip tray 116 can move in the direction of the downward slant (e.g., by means of the force of gravity) to and/or toward fluid transport mechanism 170. In some embodiments, drip tray 116 can comprise a nonstick surface to enhance the flow and/or movement of food product components that fall thereon. An upper surface 162 of smoke circulating element 160 can also be disposed at a slant and/or angle (e.g., so as to accommodate drip tray 116 and/or corresponding to the slant and/or angle thereof). It is noted that a corresponding angle need not be an exact and/or congruent angle. Drip tray 116 can also comprise a heat baffle in some embodiments.

As further illustrated in FIG. 2B, circulating heated air and/or smoke 210 can settle to a bottom portion of internal grilling compartment 112 (e.g., to the side 164 of smoke circulating element 160) as settled air and/or smoke 220. Settled air and/or smoke 220 can escape grilling device 100, oven section 102, and/or internal grilling compartment 112 thereof (e.g., by means of an exhaust element 118 and/or exhaust opening 119) as exhausted air and/or smoke 230.

It is noted that in certain embodiments, exhausting air and/or smoke 230 through other than exhaust element 118 and/or exhaust opening 119 can be undesirable. In particular, in some embodiments, it can be desirable to maintain and/or retain circulating heated air and/or smoke 210 within internal grilling compartment 112 for an extended period of time. However, if circulating heated air and/or smoke 210 (and/or settled air and/or smoke 220) is allowed to escape internal grilling compartment 112 prematurely, grilling device 100 may not operate efficiently and/or as intended. In addition, it can be aesthetically displeasing for smoke to escape and/or billow out of grilling device 100, oven section 102, and/or internal grilling compartment 112 through other than exhaust element 118 and/or exhaust opening 119. Indeed, grilling device 100 can comprise a smoker in certain embodiments. Such smoking devices can be intended and/or designed to retain heated air and/or smoke within internal grilling compartment 112 for an extended period of time without substantially, unintentionally escaping.

Figure 3:
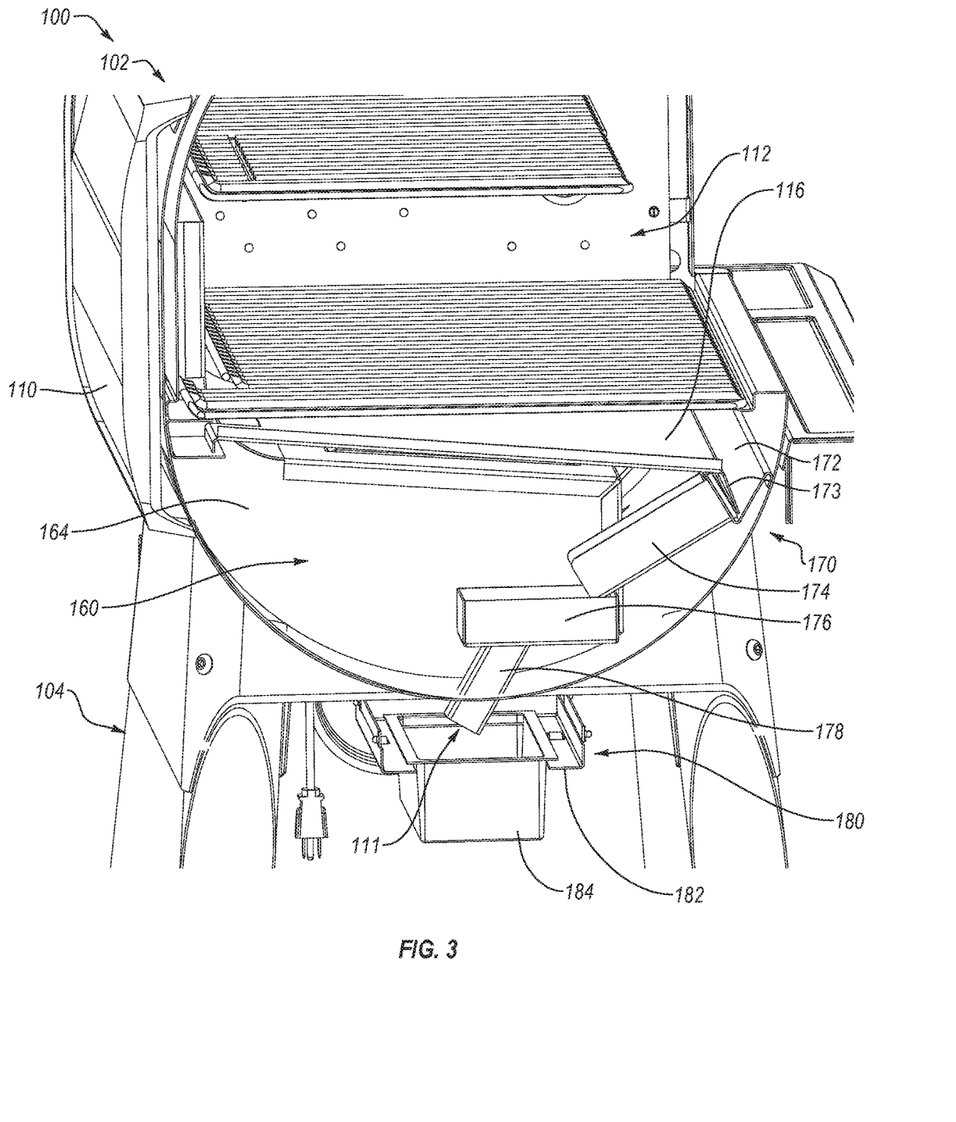
FIG. 3 illustrates a detailed cutaway view of the grilling device of FIGS. 1A and 1B showing certain features of the grease management system with smoke trap apparatus according to an implementation of the present disclosure.

As depicted in FIG. 3, and with some continued reference to FIG. 2B, grilling device 100, oven section 102, and/or outer wall 110 thereof can comprise a discharge opening 111 (e.g., in a bottom portion thereof and/or for discharging the one or more food product components that pass through fluid transport mechanism 170). Fluid transport mechanism 170 can include a first fluid transport element 172. First fluid transport element 172 can comprise a channel or trough (e.g., extending across the front portion of the grilling device 100, oven section 102, and/or internal grilling compartment 112 thereof.

First fluid transport element 172 can also have at least one opening 173. Opening 173 can be configured for draining and/or discharging food product components that are transferred into first fluid transport element 172 by means of drip tray 116. Accordingly, in at least some embodiments, first fluid transport element 172 can be disposed at a slant and/or angle sufficient to allow the food product components received therein to move towards opening 173. Thus, a first end of first fluid transport element 172 adjacent to opening 173 can be supported and/or disposed at a position (vertically) lower than an opposing second end of first fluid transport element 172 opposite the first end and/or distal to opening 173 (e.g., by means of one or more mounting elements disposed at an angle of and/or at different vertical positions).

Figure 7:
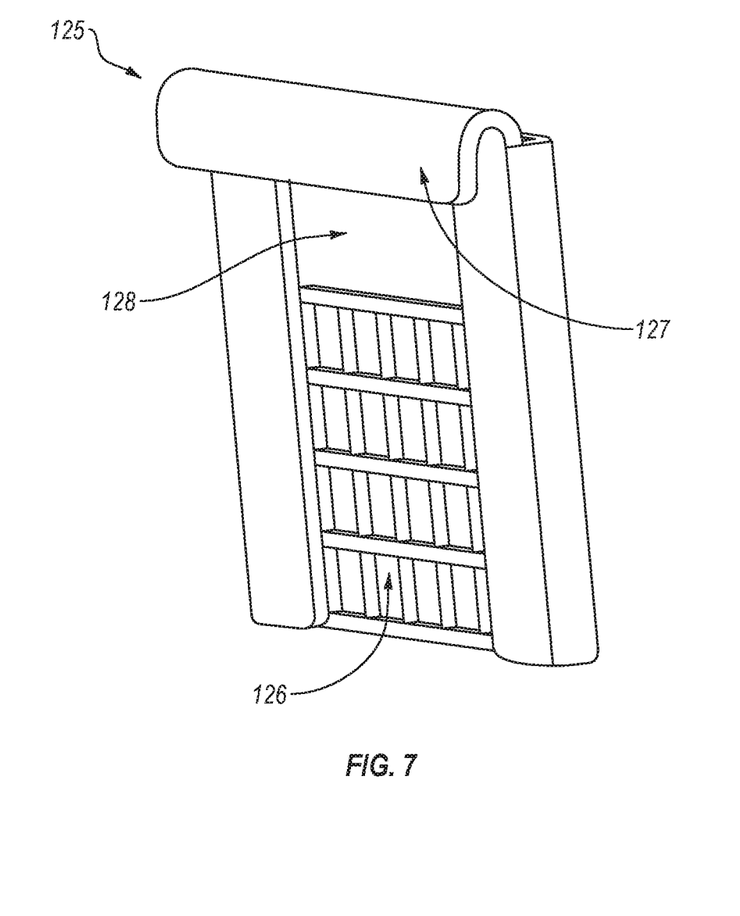
FIG. 7 illustrates a perspective view of a filtering device useful in certain implementations of the present disclosure.

Some embodiments can include an optional filtering element or device 125 (see FIG. 7). Filtering element 125 can substantially prevent and/or inhibit material of a certain size from passing therethrough. Accordingly, filtering element 125 can substantially prevent and/or inhibit food product material of a certain size from passing therethrough. In at least one embodiment, filtering element 125 can comprise a weir, screen, mesh, grate, or other size-exclusion mechanism 126. Filtering element 125 can be removable, washable, cleanable, and/or able to have filtered materials removed therefrom (e.g., such that filtering element 125 can be reused and/or reusable) in some embodiments.

Filtering element 125 can be disposed at or near opening 173 in some embodiments. For instance, filtering element 125 can slide or clip onto a portion of first fluid transport element 172 adjacent to opening 173 (e.g., via an attachment mechanism 127). Thus, filtering element 125 can cover at least a portion of opening 173 (e.g., from the inside of first fluid transport element 172 (within the transport channel or trough thereof) or from the outside thereof) so as to prevent food product components of a certain size (e.g., greater than or equal to the size of the size-exclusion mechanism) from passing therethrough and/or clogging opening 173. It will be appreciated, however, that filtering element 125 can be disposed elsewhere without necessarily departing from the scope of this disclosure. For instance, the filtering element can be disposed up-stream from opening 173 and/or at any suitable position within, about, connected to, associated with, and/or adjacent to fluid transport mechanism 170.

In certain embodiments, a top or other portion of filtering element 125 can have an opening 128 disposed above and/or adjacent to size-exclusion mechanism 126 that can allow grease or other smaller food product material to flow or travel past and/or through filtering element 125, while larger materials can be trapped and/or retained by size-exclusion mechanism 126. Such an arrangement can operate similar a bathroom sink that has a hole in the top of the sink basin that allows water to drain and prevents overflow in a stoppered sink. Thus, filtering element 125 can also have a mechanism for preventing spill over or overflow of food product materials in first fluid transport element 172 (e.g., over the upper side edges thereof).

Fluid transport mechanism 170 can also include an optional first fluid chute 174. First fluid chute 174 can, for example, be connected to or disposed adjacent to the first fluid transport element 172 at or near opening 173. Accordingly, food product components discharged from first fluid transport element 172 by means of opening 173 can flow and/or otherwise move into first fluid chute 174. Filtering element 125 describe above may substantially prevent larger food product components from clogging opening 173 and preventing smaller food product components from passing through opening 173 and to first fluid chute 174 in some embodiments. First fluid chute 174 can also be disposed at an angle and/or slant such that food product components slide downward (e.g., by means of the force of gravity) and empty into a fluid receptacle 176. Fluid receptacle 176 can have an upper opening (see FIG. 5) through which the food product components slide into fluid receptacle 176.

Alternatively, food product components can be transferred from first fluid transport element 172 (directly) into fluid receptacle 176. For instance, fluid receptacle 176 can be positioned (directly) below opening 173 such that food product components pass through opening 173 and drip, fall, or otherwise move into fluid receptacle 176 (e.g., through the upper opening).

Fluid receptacle 176 can also have a lower fluid opening (see FIG. 5) disposed therein (e.g., in a bottom portion thereof) for further discharging the food product components. A second fluid chute 178 can be connected to or disposed adjacent to fluid receptacle 176 at or near the lower fluid opening of receptacle 176. Second fluid chute 178 can have an exit opening disposed therein for discharging food product components passing therethrough. Accordingly, food product components discharged from receptacle 176 by means of the lower fluid opening can pass by means of and/or through second fluid chute 178 and/or the exit opening thereof, and out of grilling device 100, oven section 102, and/or internal grilling compartment 112 by means of discharge opening 111 and into a food product component discharge element 180 (e.g., disposed outside and/or external to grilling device 100, oven section 102, and/or internal grilling compartment 112).

Discharge element 180 can be disposed and/or positioned beneath grilling device 100, oven section 102, and/or internal grilling compartment 112, within and/or between components of support element 104, and/or at any other suitable location. Discharge element 180 can also be disposed and/or positioned beneath the exit opening of second fluid chute 178.

Figure 4A:
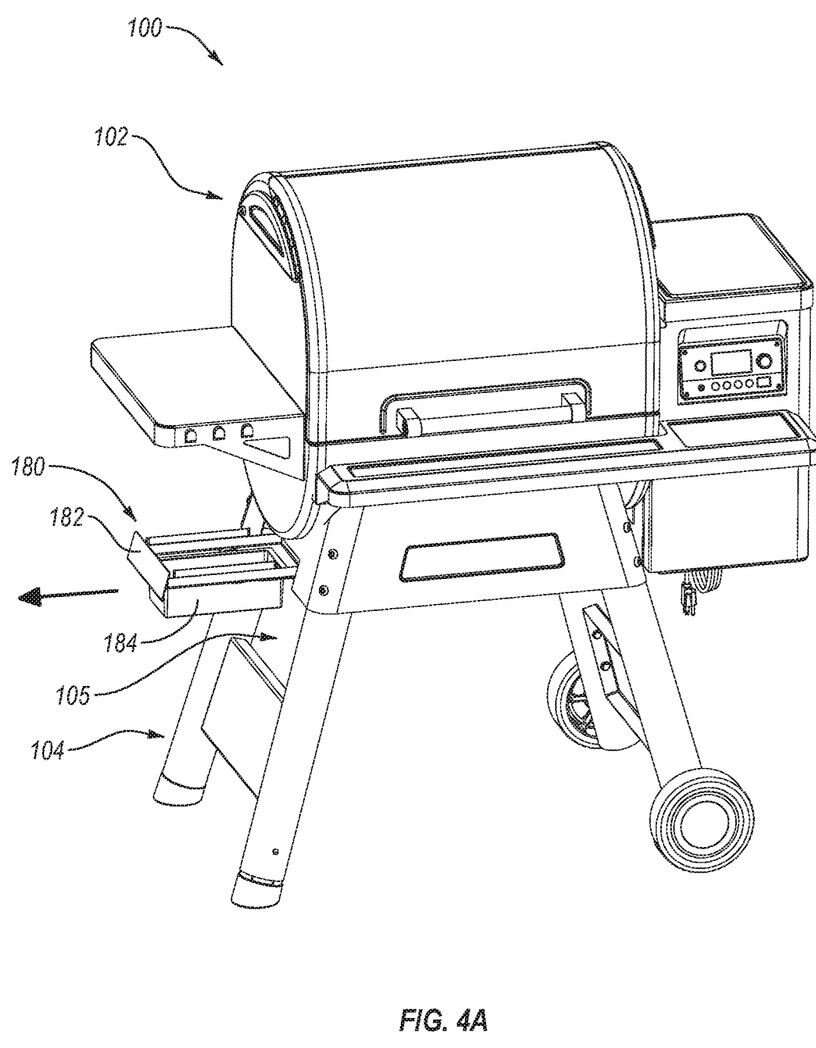
FIGS. 4A and 4B illustrate, respectively, a perspective view of the grilling device of FIGS. 1A and 1B in the closed configuration showing removal of a portion of the grease management system according to an implementation of the present disclosure.
Figure 4B:
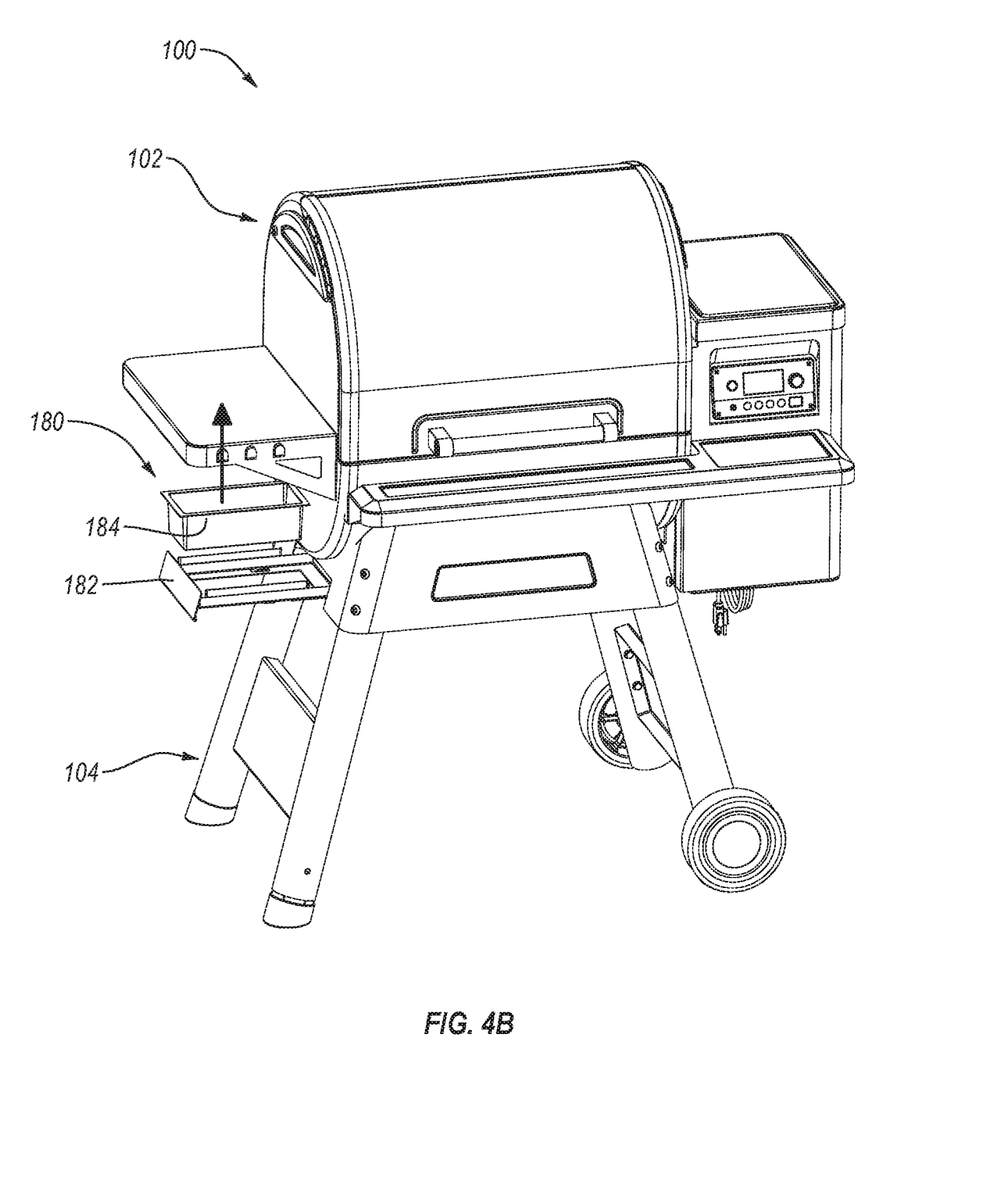

Discharge element 180 can comprise a support element 182 and/or a discharge container 184. As further depicted in FIGS. 4A and 4B, discharge element 180 can be configured for selective removal of discharge container 184. For instance, FIG. 4A illustrates that support element 182 can be pulled and/or slid outward from beneath oven section 102 of grilling device 100 in the direction of the arrow shown. Support element 104 can be configured with a pass-through opening 105 to access discharge element 180 from the installed position (see FIG. 1A) to the extracted position illustrated in FIG. 4A. As depicted in FIG. 4B, discharge container 184 can be removed from support element 182 (e.g., by lifting discharge container 184 upward in the direction of the arrow shown and/or out of support element 182) to dispose of the discharged food product components and/or for cleaning.

Figure 5:
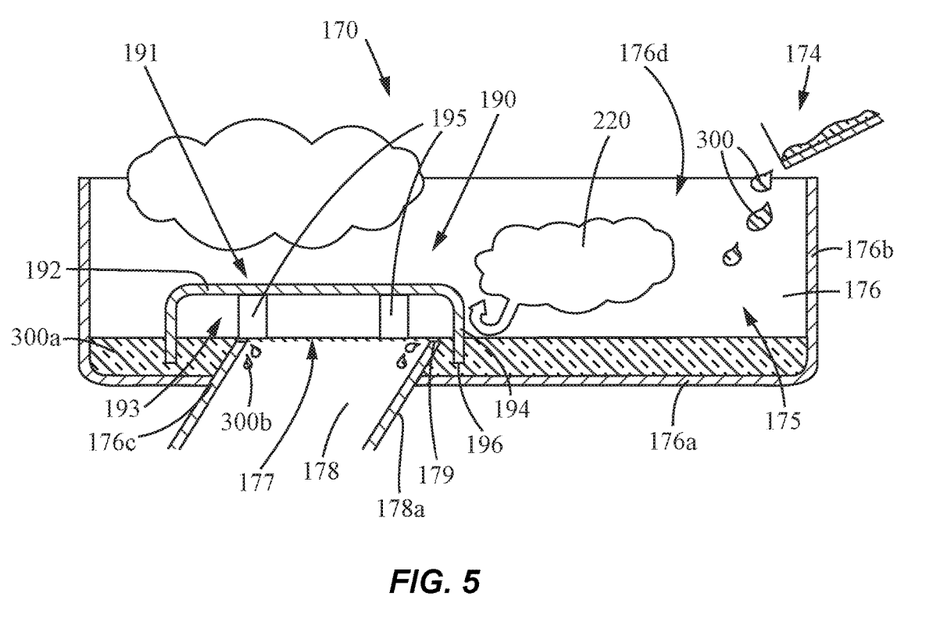
FIG. 5 illustrates a schematic view of certain features of the grease management system with smoke trap apparatus according to an implementation of the present disclosure.

Returning briefly to FIG. 3, discharge opening 111 and/or one or more components of fluid transport mechanism 170 can be disposed and/or positioned to the side 164 of smoke circulating element 160. Accordingly, it may be necessary in some embodiments to inhibit and/or prevent settled air and/or smoke 220 (see FIG. 2B), which can settle to the side of smoke circulating element 160 and/or adjacent to, about, or around discharge opening 111, from exhausting and/or exiting internal grilling compartment 112 by means of discharge opening 111. Accordingly, as illustrated in FIG. 5, certain embodiments of the present disclosure can include a smoke trap device or apparatus 190.

Smoke trap apparatus 190 can be disposed in a receptacle cavity 175 of receptacle 176. Receptacle 176 can comprise a floor 176a and/or a perimeter wall 176b (e.g., extending from floor 176a). Floor 176a and perimeter wall 176b partially bound receptacle cavity 175. In addition, floor 176a can have a floor opening 176c formed and/or disposed therein. Receptacle 176 and/or perimeter wall 176b thereof can also have an (upper) opening 176d disposed and/or formed therein. Second fluid chute 178 can deliver and/or transfer one or more food product components 300 (e.g., grease) into receptacle 176 or receptacle cavity 175 thereof through upper opening 176d in some embodiments. Food product component 300a received into receptacle 176 or receptacle cavity 175 thereof can be discharged therefrom via lower floor opening 176c as discharged food product component 300b.

Smoke trap apparatus 190 can comprise a capping element 191. Capping element 191 can include an upper wall 192 and/or a side wall 194. For instance, side wall 194 can extend from upper wall 192 (e.g., toward floor 176a of receptacle 176). Upper wall 192 and side wall 194 can partially bound a body cavity 193. In at least one embodiment, capping element 191 can be supported (e.g., by a propping element 195) above receptacle floor 176a such that at least a portion of a lower end 196 of capping element 191 or side wall 194 thereof does not touch floor 176a and/or is separated therefrom by a distance. Thus, in certain embodiments, a space can be disposed between capping element 191 or side wall 194 thereof and floor 176a.

Some embodiments can include a tubular riser 178a surrounding floor opening 176c. Riser 178a can comprise an encircling side wall that extends from floor 176a of receptacle 176 into body cavity 193 of capping element 191. Riser 178a can also have an aperture 177 at an upper end 179 thereof positioned and/or disposed in or within receptacle cavity 175 and/or in fluid communication with floor opening 176c and/or receptacle cavity 175. In some embodiments, filtering element 125 described above can be disposed and/or positioned over or adjacent to aperture 177 (e.g., to prevent larger food product components from clogging aperture 177 and preventing smaller food product components from passing through aperture 177 and through second fluid chute 178 and/or riser 178a in some embodiments. Aperture 177 can also be positioned and/or disposed (partially or entirely) within body cavity 193 of capping element 191. In some embodiments, riser 178a can comprise a portion of second fluid chute 178 (e.g., extending through floor 176a and into receptacle cavity 175). In other embodiments, riser 178a can comprise a separate element.

Upper end 179 of riser 178a can comprise a propping element 195 in certain embodiments. The propping element 195 can support capping element 191 above receptacle floor 176a such that capping element 191 does not fluidly seal aperture 177. In addition, aperture 177 can thereby be in fluid communication with body cavity 193. Likewise, body cavity 193 can thereby be in fluid communication with receptacle cavity 175 (e.g., because capping element 191 is supported above receptacle floor 176a such that at least a portion of a lower end 196 of capping element 191 or side wall 194 thereof does not touch floor 176a and/or is separated therefrom by a distance or space). In an alternative embodiment, the propping element 195 can be connected to and/or extend from capping element 191, receptacle 176, or another component of fluid transport mechanism 170, smoke trap apparatus 190, etc.

As illustrated in FIG. 5, a fluid or other material (e.g., food product component 300a) disposed in receptacle cavity 175 can exit receptacle 176 and/or receptacle cavity 175 thereof (freely) through floor opening 176c and/or aperture 177 by passing under side wall 194 of capping element 191, and then over the side wall of riser 178a so as to pass through aperture 177 and through floor opening 176c. However, in some embodiments, settled air and/or smoke 220 in receptacle cavity 175 can be substantially precluded, prevented, and/or inhibited from exiting receptacle cavity 175 through floor opening 176c and/or aperture 177 because food product component 300a disposed in receptacle 176 or receptacle cavity 175 thereof prevents and/or inhibits settled air and/or smoke 220 from passing under side wall 194 of the capping element 191, and then over the side wall of riser 178a so as to pass through aperture 177 and through floor opening 176c. Settled air and/or smoke 220 can, however, exit receptacle 176 or receptacle cavity 175 thereof (freely) through upper opening 176d in perimeter wall 176b in some embodiments.

Figure 6A:
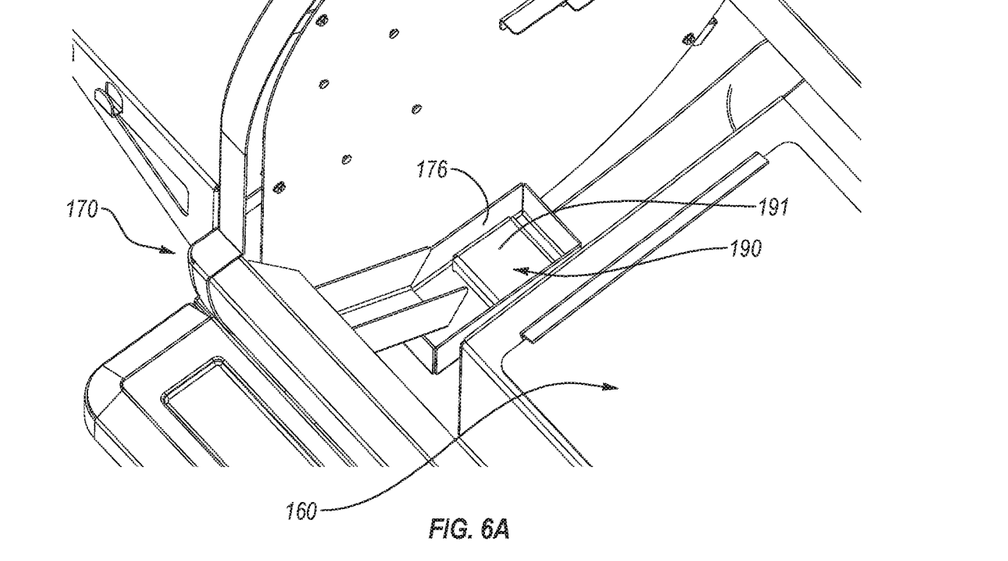
FIGS. 6A and 6B illustrate, respectively, a detailed view of the grilling device of FIGS. 1A and 1B in the opened configuration having the grease management system with smoke trap apparatus with (FIG. 5A) and without (FIG. 5B) a portion of the smoke trap apparatus according to an implementation of the present disclosure.
Figure 6B:
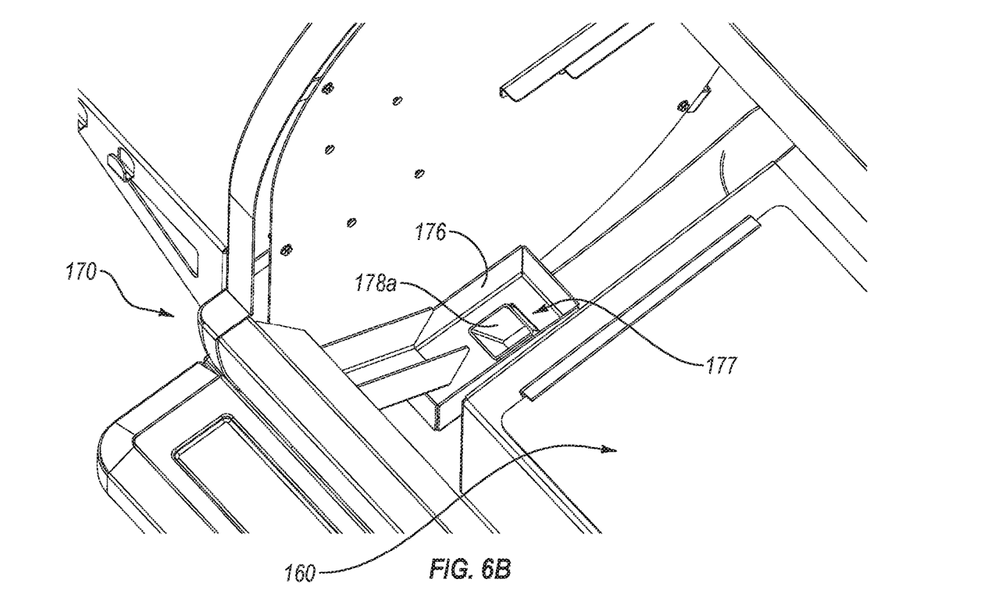

FIGS. 6A and 6B illustrated the access and removability of capping element 191 to access and/or expose aperture 177 in riser 178a. For instance, lid 120 can be opened and one or more of grill racks 114 and drip tray 116 can be moved or removed to provide access to smoke trap apparatus 190, as shown in FIG. 6A. Thereafter, capping element 191 can be removed to provide access to aperture 177, as shown in FIG. 6B.

Because smoke trap apparatus 190 and/or components of fluid transport mechanism 170 are positioned and/or disposed beside smoke circulating element 160 (as opposed to beneath or within smoke circulating element 160), receptacle 176, aperture 177, and other components can be easily maintained and/or cleaned by removal of selectively removable capping element 191. It will be appreciated, however, that other positions for smoke trap apparatus 190 and/or components of fluid transport mechanism 170, including beneath or within smoke circulating element 160, are also contemplated herein.

The foregoing detailed description makes reference to specific exemplary embodiments. However, it will be appreciated that various modifications and changes can be made without departing from the scope contemplated herein and as set forth in the appended claims. In particular, while illustrative exemplary embodiments in this disclosure have been more particularly described, the present disclosure is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based on the language employed in the claims and not limited to examples described in the foregoing detailed description, which examples are to be construed as non-exclusive.

Moreover, any steps recited in any method or process described herein and/or recited in the claims may be executed in any order and are not necessarily limited to the order presented in the claims, unless otherwise stated (explicitly or implicitly) in the claims. Accordingly, the scope of the invention should be determined solely by the appended claims and their legal equivalents, rather than by the descriptions and examples given above.

It will also be appreciated that various features, members, elements, parts, and/or portions of certain embodiments of the present invention are compatible with and/or can be combined with, included in, and/or incorporated into other embodiments of the present invention. Thus, disclosure of certain features, members, elements, parts, and/or portions relative to a specific embodiment of the present invention should not be construed as limiting application or inclusion of said features, members, elements, parts, and/or portions to the specific embodiment. Rather, it will be appreciated that other embodiments can also include said features, members, elements, parts, and/or portions without necessarily departing from the scope of the present invention. Likewise, certain embodiments can include fewer features than those disclosed in specific examples without necessarily departing from the scope of this disclosure.

In addition, the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A device for at least one of grilling and smoking food products, comprising:
    an oven section having an outer wall and a lid that at least partially enclose an internal grilling compartment;
    at least one rack for supporting food products within the internal grilling compartment; and
    a grease management system, comprising:
        a drip tray disposed below the at least one rack within the internal grilling compartment;
        a receptacle having a floor and a perimeter wall extending upward from the floor, the floor and perimeter wall of the receptacle forming a receptacle cavity into which grease falling onto the drip tray is directed, the floor of the receptacle having a drain opening;
        a tubular riser comprising a side wall surrounding the drain opening and extending upward from the floor of the receptacle into the receptacle cavity, an upper end of the tubular riser including an opening to an interior of the tubular riser, the opening positioned within the receptacle cavity and in fluid communication with the drain opening in the floor of the receptacle such that grease or liquid within the receptacle cavity can flow into the tubular riser through the opening and out from the receptacle cavity through the drain opening in the floor of the receptacle upon reaching a depth within the receptacle cavity; and a capping element having an upper wall and a side wall extending downward from the upper wall, the capping element positioned over the tubular riser and configured such that grease or liquid within the receptacle cavity can flow under the upper wall of the capping element and into the tubular riser, the capping element further configured such that a quantity of grease or liquid within the receptacle cavity would preclude smoke within the oven section from flowing out from the oven section through the tubular riser.

2. The device of claim 1, wherein the opening to the interior of the tubular riser is disposed a first distance above the floor of the receptacle and a lower end of the side wall of the capping element is disposed a second distance above the floor of the receptacle, wherein the second distance is less than the first distance.

3. The device of claim 2, wherein the grease management system further comprises a fluid transfer element having a fluid transport channel positioned between the drip tray and the receptacle and configured to guide flow of grease or liquid from the drip tray to the receptacle.

4. The device of claim 3, wherein the grease management system further comprising a propping element supporting the capping element above the tubular riser.

5. The device of claim 4, wherein the propping element extends from the tubular riser to the capping element.

6. The device of claim 5, wherein the receptacle of the grease management system is located within the internal grilling compartment of the oven section.

7. The device of claim 6, wherein the device comprises a wood pellet grill.

8. The device of claim 7, wherein the wood pellet grill comprises a hopper for storing wood pellets and an auger for conveying the wood pellets from the hopper to a location within the internal grilling compartment.

9. The device of claim 1, wherein the grease management system further comprises a fluid transfer element having a fluid transport channel positioned between the drip tray and the receptacle and configured to guide flow of grease or liquid from the drip tray to the receptacle.

10. The device of claim 1, wherein the grease management system further comprising a propping element supporting the capping element above the tubular riser.

11. The device of claim 10, wherein the propping element extends from the tubular riser to the capping element.

12. The device of claim 1, wherein the receptacle of the grease management system is located within the internal grilling compartment of the oven section.

13. The device of claim 1, wherein the device comprises a wood pellet grill.

14. The device of claim 13, wherein the wood pellet grill comprises a hopper for storing wood pellets and an auger for conveying the wood pellets from the hopper to a location within the internal grilling compartment.

* * * * *